Jan. 29, 1963 E. F. ROWEKAMP 3,075,800
INTERNALLY GRIPPING ARTICLE TRANSFERRING APPARATUS
Filed March 29, 1962
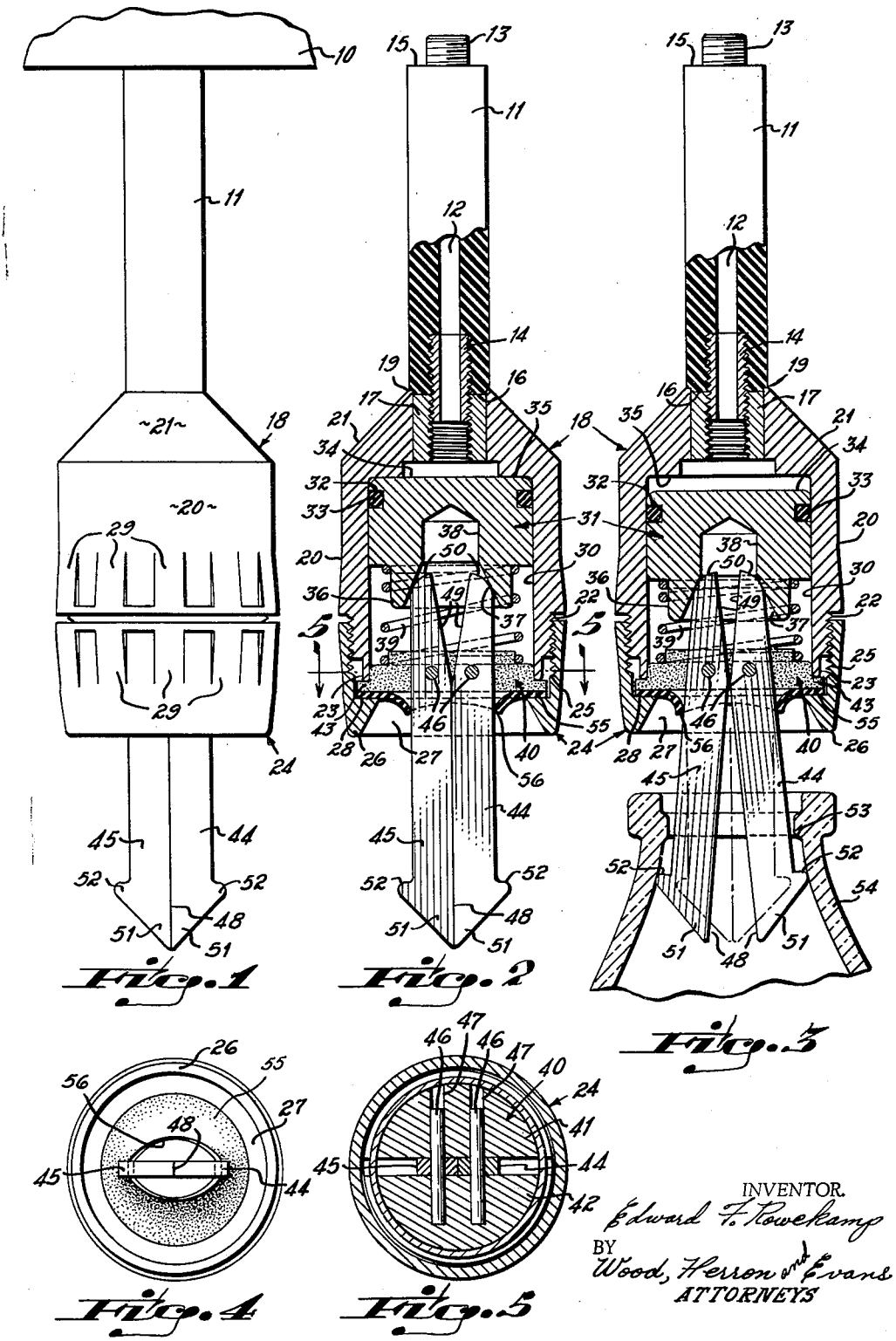
INVENTOR.
Edward F. Rowekamp
BY
Wood, Herron & Evans
ATTORNEYS

United States Patent Office 3,075,800
Patented Jan. 29, 1963

3,075,800
INTERNALLY GRIPPING ARTICLE TRANS-
FERRING APPARATUS
Edward F. Rowekamp, Cincinnati, Ohio, assignor to The
Lodge & Shipley Company, Cincinnati, Ohio, a corporation of Ohio
Filed Mar. 29, 1962, Ser. No. 183,493
3 Claims. (Cl. 294—88)

This invention relates to article transferring apparatus which is employed in the handling of open mouthed containers, such as jars, during loading and unloading operations in which the containers are removed from or are inserted into cartons or cases. It is the usual practice in operations of this sort to provide a gripping device for each container which is to be removed from or inserted into a carton. Thus, the gripping devices are arranged in gangs in the same pattern as the containers are arranged in the carton and all gripping devices operate simultaneously.

More specifically, the invention is directed to an adaptation of the lifting cup which is disclosed in U.S. Patent No. 2,873,996. The lifting cup of that patent comprises essentially a cylindrical shell having a bladder-like, circular gripper inside of it which is adapted to be engaged over the neck of a bottle. The cup is suspended from an air pressure manifold head by means of a flexible hose. When the bladder is uninflated, its inner diameter is substantially larger than the neck of the bottle to be engaged. However, upon the application of air pressure, the bladder inflates to reduce its inner diameter and thereby grasp the neck of the bottle.

The flexible hose which is employed to suspend the cup plays an important role in the successful operation of the patented device. The mouth of the cup flares and when the cup is lowered onto a bottle that is not aligned properly with it, the flexible hose permits the cup to shift, being guided by the flared mouth, which permits the misaligned bottle to be engaged and lifted. The engagement between the bladder and bottle is, of course, on the outside of the neck of the bottle. This type of engagement cannot be used for wide mouth jars, because in the case of such jars, there is no room between adjacent jars in a carton for the cups. In this instance, the engagement must be an internal one with the contact being between the inner surface of a jar and a device insertable into the open mouth of the jar.

It has been an objective of this invention to provide an air operated lifting device for handling open mouthed containers, such as jars, which incorporates all of the desirable, self-aligning features of the patented lifting cup and to do this by using as many of the basic parts of the patented cup as possible in order to reduce costs and to have the advantage of interchangeability of parts between these two different types of lifting devices.

In a typical case unloading operation utilizing lifting cups of the patent, a machine is provided which is designed to unload, or uncase, three cases of bottles in one cycle. With each case containing twenty-four individual bottles, seventy-two individual lifting cups are required. These lifting cups are attached to a single head comprising an air pressure manifold. When air is applied to the manifold head, the bladders in all seventy-two cups are inflated. The manifold head is carried by a relatively expensive machine which is designed to move the manifold head through a prescribed path in order to grasp all seventy-two bottles, withdraw them from the three cases, then transport them to a conveyor and release them.

It may be appreciated that in the initial purchase of such a machine, the cups are relatively inexpensive considering the overall cost of the machine. In order to convert such a machine from a straight bottle operation to a wide mouthed container operation, from a practical point of view it is necessary only to substitute the lifting device of this invention for the cups of the patent. This complete substitution of the lifting devices of this invention for the cups of the patent would be done where it is desirable to use the one basic machine for both types of operations. However, inasmuch as the basic parts of the lifting cup of the patent are retained in this lifting device, a permanent change over from a bottle operation to a wide mouth container operation can be accomplished merely by substituting the internal parts of the present lifting device for the bladder and its associated parts of the patented lifting cup.

In the preferred embodiment, the lifting device of this invention utilizes the identical hose, the identical cup and the identical flared mouth of the patented lifting device. The bladder is replaced by a piston, this piston fitting up inside the cup and being arranged so that it lowers upon the application of air pressure to the hose against the force of a coil spring. Jars and other open mouth containers are lifted by means of two fingers which, upon the lowering of the piston inside the cup, move away from one another so that they come in contact with the inner surface of the container at diametrically opposed places. Cam surfaces upon the underside of the piston cause the expanding movement of the fingers relative to one another. The piston is returned to its elevated position within the cup by means of the coil spring. The two fingers are pivoted upon a disc-like assembly which fits into the cup, being gripped and held in position by means of the mouth portion of the cup which, as shown in the patent, is adapted to be threaded into place upon the cup itself. Only one other element is required and this is a means to return the fingers from their relatively expanded positions to a closed position, and in the preferred embodiment of this invention this means takes the form of a circular, rubber diaphragm which has a slit in it through which the fingers project. The resiliency of the rubber diaphragm returns the fingers to their relatively closed positions and the diaphragm also serves to prevent the entry of extraneous material into the interior of the cup.

Other objectives and advantages of the invention will be readily apparent to those skilled in the art from the following detailed description of the drawings, in which:

FIGURE 1 is a side elevational view of a lifting device incorporating the principles of this invention.

FIGURE 2 is a cross sectional view taken on a plane passing vertically through the central axis of the lifting device. In this view the fingers of the lifting device are shown in closed positions.

FIGURE 3 is a view similar to FIGURE 2 showing the lifting fingers in relatively expanded positions engaged into an open mouth container, such as a milk bottle, the milk bottle being shown fragmentarily only.

FIGURE 4 is a bottom plan view of the lifting device as it appears in FIGURE 1 with the fingers in relatively closed positions.

FIGURE 5 is a cross sectional view taken on the line 5—5 of FIGURE 2.

A small portion only of an air pressure manifold head is indicated at 10. A rubber hose 11 is shown attached to manifold head 10, and the hose has an internal passageway 12 to deliver air under pressure from head 10. Two, threaded brass nipples 13 and 14 project from the opposite ends of the rubber hose. Preferably these bushings are threaded from one end to the other and they are molded directly into the rubber hose. The opposite ends of the hose are flat to provide two annular areas 15 and 16 surrounding the projecting ends of nipples 13 and 14.

These areas provide seals when the nipples are threaded into the manifold 10 at the one end and into a bushing 17 at the opposite end. Bushing 17 is molded into a plastic cup or shell designated generally by 18 so that it becomes an integral part thereof. The upper end of cup 18 is configurated to provide a circular ridge 19 which, when the hose is threaded into bushing 17, serves as an auxiliary seal for the lower end of the hose.

Cup 18 is generally cylindrical in the lower portion 20, however, the upper end of the cup, designated 21, is in the shape of a frustum of a cone. Adjacent to the lower end of cup 18 the cylindrical portion 20 is of reduced diameter and it is threaded as shown at 22. The very lower edge of the cup is of even greater reduced diameter to provide a rim 23 of narrow proportions. The lower end of the cup is enclosed by means of a mouthpiece designated generally by the numeral 24. This mouthpiece is generally in the form of a hollow cylinder and it has internal threads at 25 which engage the threads 22 on cup 18. The bottom rim of the mouthpiece 24 is rounded as shown at 26 and the internal wall of the mouthpiece tapers inwardly from the rounded lower edge 26 to provide a throat 27 which, looking at it the other way, flares outwardly. A shelf 28 is provided internally of the flared part of the mouthpiece, this shelf being in a horizontal plane and comprising a seat.

The parts of the lifting device of this invention which have been described to this point are identical with corresponding parts of the patented lifting cup. This includes a series of ribs 29 which are formed on the cup 18 and on the mouthpiece 24 to provide grips to assist in assembly and disassembly. Also as in the patented lifting device, the cup 18 is hollow internally to provide in this case a cylinder, the wall of which is designated 30, which receives a piston designated generally by the numeral 31. A somewhat loose slip fit is provided between the wall of the piston and the internal wall of the cylinder 30. In order to provide a seal, the piston has a peripheral groove 32 in its wall adjacent to the upper end thereof, this groove receiving an O-ring 33. In order that there be no binding between the O-ring and the cylinder wall, it is preferred that the lifting device be lubricated at the time of initial assembly by applying a film of a grease to the inside of the cylinder, this grease being selected from a group of greases which does not adversely affect rubber.

The top of the piston is designated 34 and it is flat. In its elevated position the top of the piston engages an annular area designated 35 which surrounds the entrance for air from the hose into the top of the cylinder. The underside of the piston has an annular boss 36 which depends from the piston proper. This annular boss is configurated to provide an outwardly and downwardly flaring surface 37 which provides a cam surface in the shape of a frustum of a cone. The upper end of this outwardly and downwardly flaring cam surface terminates at a bore 38 which is centered within the body of the piston. As shown, the boss 36 is of lesser diameter than the body of the piston in order to provide a seat for a coil spring 39. The upper end of this coil spring surrounds the boss 36. The lower end of coil spring 39 rests upon a disc assembly indicated generally by the numeral 40. This disc assembly is made of two segments designated 41 and 42 respectively. The disc assembly is circular as viewed from the top as may be seen from FIGURE 5. As viewed in FIGURES 2 and 3 the outer marginal area of the disc assembly is stepped to provide a horizontal shelf 43 which in the assembly makes contact with the lower rim 23 of the body of the cup 18. The two segments of the disc are separated by two gripper fingers 44 and 45 which are pivoted upon two pins 46—46 which are received within two bores 47—47 which extend through segment 41 and partially through segment 42. These pins provide pivots for the two fingers 44—45. It will be appreciated that the parts 41—42 of the disc assembly may be molded as one piece with appropriate clearances being provided for the two gripper fingers 44—45.

As may be seen in FIGURE 2, the two gripper fingers 44—45 have straight inner edges 48—48 below pins 46—46 which, when in the position of FIGURE 2, make contact with one another. Above the pivot pins 46—46 the inner edges of the two fingers, although straight, angle away from one another as indicated by 49—49. This provides clearance so that the lower ends of the two fingers may be swung away from one another as is shown in FIGURE 3. In order to effect this swinging away from one another the outer upper edges of the two fingers are rounded off as designated at 50, these rounded off surfaces cooperating with the outwardly and downwardly flaring cam surface 37 of the piston. The lower end 51 of each of the fingers is slanted as shown in FIGURE 2 so that the two fingers define an arrowhead including shoulders 52—52 which are at the outer ends of the upwardly slanting lower edges 51—51. It is intended that these shoulders cooperate with an internal rib such as the one shown at 53 in FIGURE 3 of an open mouthed container, such as a milk bottle, the upper neck portion only of which is shown at 54. In some containers the ridge 53 may not have to be as well defined as that shown in FIGURE 3.

A rubber diaphragm 55 is mounted in the assembly immediately below the disc assembly 40. This diaphragm is circular in outline and it has a hole shown at 56 in its center which is of smaller diameter than the combined widths of fingers 44—45 so that the edges of the hole grip the fingers and tend to force them into the closed position shown in FIGURE 2. This diaphragm also serves the function of preventing the entry of extraneous material into the cup. As may be seen in FIGURES 2 and 3 the outer marginal area of the circular disc 55 seats upon the shelf 28 within mouthpiece 24. The tightening of the mouthpiece onto the cup itself compresses this marginal area so that in effect the diaphragm becomes a locking device to prevent the loosening of the mouthpiece on threads 22.

The self aligning feature of the hose 11 is retained in the present lifting device. In this case, the arrowhead configuration for the fingers 44—45 serves as a guide in the event a misaligned container is encountered. The slanting surfaces 51—51 on the lower edges of the fingers serve to shift the cup to one side or the other and thereby guide the fingers into the open mouth of the container.

The operation of the lifting device is as follows. With the manifold head 10 above a case to be unloaded, the head lowers to bring the fingers down into the containers. Air pressure is then applied to the manifold and it is directed to the top of cylinder 30 through hose 11. This depresses the piston against the force of coil spring 39 causing the cam surface 50 at the underside of the piston to force the upper ends of the fingers together. This causes the lower ends of the fingers to move away from one another into the positions shown in FIGURE 3. Upward movement of the manifold head brings the shoulders 52—52 on the fingers into contact with the bead 53 surrounding the inside of the container. The air pressure is held in the manifold head during the lifting movement of the manifold and during its transfer movement to the point of delivery for the containers. When this point is reached the pressure is released in the manifold head and the coil spring 39 returns piston 31 to its elevated position. This frees the upper ends of the fingers 44—45 and the resiliency of the diaphragm returns the two fingers to their closed positions.

Having described my invention, I claim:

1. A device for use with article transferring apparatus to engage and lift open mouthed containers comprising:
a shell having a hollow interior to provide a cylinder which is open at the bottom, the lower portion of said shell having external screw threads thereon,
a flexible hose connected to the top of said shell and providing passageway for air under pressure to the top of said cylinder, a piston in said cylinder adapted to move downwardly upon the application of air under pressure to the top of said cylinder, means on the underside of said piston providing cam surfaces which extend downwardly and outwardly with respect to a vertical central axis of said piston, a mouthpiece having internal screw threads engaging the external screw threads on the lower end of said shell and presenting an annular shelf toward the bottom of said shell, a disc assembly seated on said annular shelf and held against the lower end of said shell by said mouthpiece, spring means within said shell normally urging said piston toward an elevated position within the cylinder, a pair of elongated fingers, means to pivotally mount said fingers in said disc assembly for swinging movement of their lower ends toward and away from one another in a vertical plane which is common to the vertical central axis of said cylinder, the ends of said fingers above said disc assembly having cam surfaces thereon adapted to be contacted by the cam surfaces on the underside of said piston upon downward movement of said piston to swing the lower ends of said fingers away from one another and into contact with the inner wall of an open mouthed container upon the insertion of said fingers into said container, and resilient means normally urging said fingers toward one another, whereby upon the release of said air pressure the fingers are moved toward one another by said resilient means.

2. A device for use with article transferring apparatus to engage and lift open mouthed containers comprising:

a shell having a hollow interior to provide a cylinder which is open at the bottom, the lower portion of said shell having external screw threads thereon, a flexible hose connected to the top of said shell and providing passageway for air under pressure to the top of said cylinder, a piston in said cylinder adapted to move downwardly upon the application of air under pressure to the top of said cylinder, means on the underside of said piston defining cam surfaces which slant downwardly and outwardly away from the vertical central axis of said piston, spring means within said cylinder normally urging said piston toward an elevated position within the cylinder, a pair of elongated fingers, means to pivotally mount said fingers below said piston for swinging movement of their lower ends toward and away from one another in a vertical plane which is common to the vertical central axis of said cylinder, the ends of said fingers above the last named means having cam surfaces thereon adapted to be contacted by the cam surfaces on the underside of said piston upon downward movement of said piston to swing the lower ends of said fingers away from one another and into contact with the inner wall of an open mouthed container upon the insertion of said fingers into said container, and resilient means normally urging said fingers toward one another, whereby upon the release of said air pressure the fingers are moved toward one another by said resilient means.

3. A device for use with article transferring apparatus to engage and lift open mouthed containers comprising:

a shell having a hollow interior to provide a cylinder which is open at the bottom, the lower portion of said shell having external screw threads thereon, a flexible hose connected to the top of said shell and providing passageway for air under pressure to the top of said cylinder, a piston in said cylinder adapted to move downwardly upon the application of air under pressure to the top of said cylinder, an annular boss centered on the underside of said piston and having a hollow interior in the shape of the frustum of a right cone to provide cam surfaces, a mouthpiece having internal screw threads engaging the external screw threads on the lower end of said shell and presenting an annular shelf toward the bottom of said shell.

a disc assembly seated on said annular shelf and held against the lower end of said shell by said mouthpiece, a coil spring having its upper end in contact with the bottom of said piston surrounding said annular boss and having its lower end in contact with the disc assembly and being adapted to compress upon the application of air under pressure to the cylinder and to expand to move the piston upwardly upon the release of said air under pressure, a pair of elongated fingers, means to pivotally mount said fingers in said disc assembly for swinging movement of their lower ends toward and away from one another in a vertical plane which is common to the vertical central axis of said cylinder, the ends of said fingers above said disc assembly having cam surfaces thereon adapted to be contacted by the cam surfaces on said annular boss upon downward movement of said piston to swing the lower ends of said fingers away from one another and into contact with the inner wall of an open mouthed container upon the insertion of said fingers into said container, a resilient circular diaphragm having its outer marginal edge clamped between the shelf of the mouthpiece and the underside of said disc assembly, said diaphragm having a hole in its center which is normally smaller in diameter than the combined widths of said fingers, and said fingers projecting through said hole and being embraced by the edge of the diaphragm surrounding said hole to resiliently urge said fingers toward one another, whereby upon the release of said air pressure the fingers are moved toward one another by said diaphragm.

No references cited.